United States Patent
Haynes et al.

(10) Patent No.: US 7,650,819 B2
(45) Date of Patent: Jan. 26, 2010

(54) VARIABLE STIFFNESS SUPPORT

(75) Inventors: David F. Haynes, Arlington, TX (US); David L. Williams, Colleyville, TX (US); Michael R. Smith, Colleyville, TX (US); Robert J. Pascal, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 849 days.

(21) Appl. No.: 10/515,391

(22) PCT Filed: May 21, 2003

(86) PCT No.: PCT/US03/15913

§ 371 (c)(1),
(2), (4) Date: Nov. 22, 2004

(87) PCT Pub. No.: WO03/100284

PCT Pub. Date: Dec. 4, 2003

(65) Prior Publication Data

US 2005/0224685 A1    Oct. 13, 2005

(51) Int. Cl.
| F16H 57/04 | (2006.01) |
| F16H 57/02 | (2006.01) |
| F16H 61/00 | (2006.01) |
| F16H 55/14 | (2006.01) |
| H02K 5/24  | (2006.01) |

(52) U.S. Cl. .................. 74/606 R; 74/411; 74/425; 74/443; 74/604; 74/89.17; 310/51

(58) Field of Classification Search ............... 74/606 R, 74/89.17, 411, 604, 425, 443; 180/444; 310/51
See application file for complete search history.

(56) References Cited

U.S. PATENT DOCUMENTS

| 3,406,583 | A | * | 10/1968 | Baier ........................... 74/411 |
| 3,667,317 | A | * | 6/1972 | Hillingrathner .............. 74/604 |
| 4,362,281 | A |   | 12/1982 | Crespo et al. |
| 4,365,771 | A |   | 12/1982 | Halwes |
| 4,770,055 | A | * | 9/1988 | Chevance et al. ............. 74/411 |
| 5,692,410 | A | * | 12/1997 | Fenelon ........................ 74/411 |
| 5,956,998 | A | * | 9/1999 | Fenelon ..................... 74/89.17 |
| 6,000,660 | A |   | 12/1999 | Griffin et al. |
| 6,051,901 | A | * | 4/2000 | Ishida .......................... 310/83 |
| 6,212,974 | B1 | * | 4/2001 | Van Duyn ................ 74/606 R |
| 6,247,684 | B1 |   | 6/2001 | Manfredotti |
| 6,520,042 | B2 | * | 2/2003 | Jammer et al. ................ 74/425 |
| 6,523,431 | B2 | * | 2/2003 | Ozsoylu et al. ............... 74/443 |
| 7,048,088 | B2 | * | 5/2006 | Bernhard et al. ............ 180/444 |
| 7,100,734 | B2 | * | 9/2006 | Segawa ....................... 180/444 |
| 2004/0189107 | A1 | * | 9/2004 | Mattson ....................... 310/51 |

* cited by examiner

*Primary Examiner*—Vinh T. Luong
(74) *Attorney, Agent, or Firm*—James E. Walton (57) ABSTRACT

A variable stiffness support has a support housing that is configured to adjust the orientation of an internal elastomer assembly. The support housing includes an adjustment mechanism, and the elastomer assembly includes an outer ring that encircles an elastomeric material, a central bushing embedded in the elastomeric material, and a plurality of shims embedded in the elastomeric material in a parallel planar fashion.

11 Claims, 6 Drawing Sheets

VARIABLE STIFFNESS SUPPORT

GOVERNMENT LICENSE RIGHTS

The U.S. Government has a paid-up license in this invention and the right in limited circumstances to require the patent owner to license others on reasonable terms as provided for by the terms of Contract No. DAAH10-00-2-0001.

TECHNICAL FIELD

The present invention relates to devices that provide vibration attenuation and isolation at structural joints and attachments.

DESCRIPTION OF THE PRIOR ART

Mechanical vibration is a term that describes oscillatory motion resulting from fluctuating forces acting on a dynamic system, that is, a system of mass and elastic elements. In certain situations, these motions can become excessive, causing reduced life, improper function, and possible failure of the system. This is especially important in regard to aircraft, or more specifically, rotorcraft structures, where failure of the structure may result in loss of life or aircraft. Excessive vibration within these structures may also lead to discomfort or sickness of passengers or crew, impairing safe operation of the aircraft. Effective control of vibrations is very important in this and other applications.

Figure 1A:
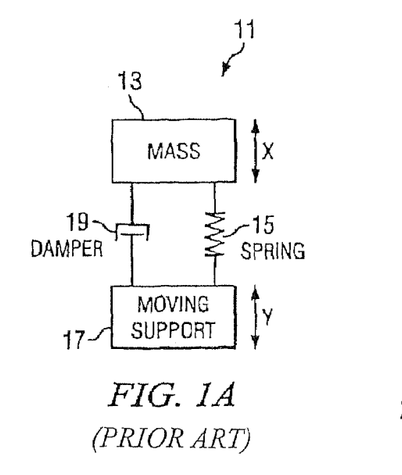
FIG. 1A is a schematic of a simple dynamic system.
Figure 1B:
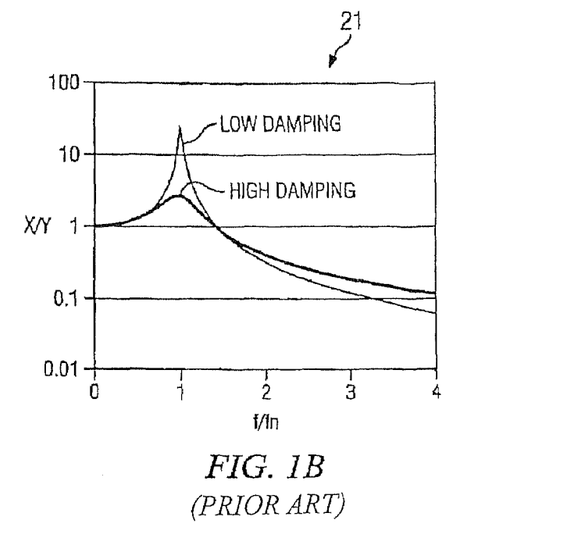
FIG. 1B is a plot of the frequency response of the dynamic system of FIG. 1A.

Of primary interest is the resonant condition, where masses and elastic members vibrate at or near their natural frequency. Referring to FIGS. 1A and 1B in the drawings, a simple dynamic system 11 where resonance can occur is illustrated schematically and with a plot, respectively. As is shown, a mass 13 is supported by a spring 15 and a damper 19 attached to a moving support 17. The motion of support 17 is oscillatory in the vertical direction. For this system, the natural frequency is simply the frequency at which mass 13 would oscillate if displaced and let go, with support 17 not moving. When support 17 is moving, the resulting motion of mass 13 with respect to support 17 depends upon the amplitude and frequency of the motion of support 17. If the driving frequency of support motion f becomes equal to the system natural frequency fn, resonance occurs, which results in very large motions of mass 13 for systems that are lightly damped. This is typical of many components and structures, and is illustrated on a plot 21 in FIG. 1B, where the maximum motion X of mass 13 with respect to the motion Y of support 17 occurs when f/fn=1.

For dynamic systems in general, a resonant condition is undesirable and potentially destructive, and should be avoided. This can be accomplished by controlling the driving frequency f and/or the natural frequency fn, or by incorporating sufficient damping. For many systems, such as helicopters, the driving frequency f remains almost constant, i.e., rotor at constant RPM, and sufficient damping is hard to implement without additional weight. As a result, avoiding resonance requires controlling the system natural frequency fn, so that the natural frequency fn is never equal to the driving frequency f. This can be done by either changing the mass or the stiffness properties of the system. Because the mass is usually fixed, the only remaining adjustment is the stiffness of the system.

The simple model of FIGS. 1A and 1B can be extended to more complex systems having multiple mass and stiffness elements, such as helicopter or tilt-rotor airframes. For these systems, multiple driving frequencies from the vibrating rotor combined with the distributed mass and stiffness throughout the airframe create a complex problem in vibration control. Historically, this problem has been overcome by isolating the structure from vibrating components, i.e., rotors, pylons, etc., and/or by building the structure very stiff, so that the system natural frequencies remain higher than any driving frequencies in the system. These frequency isolation methods are simple, but cannot be incorporated without adding significant weight to the airframe structure.

Current efforts to extend the state of the art involve the development of dynamically tailored airframe structures that are "adaptive," or able to change their dynamic characteristics as desired. By changing the stiffness properties of the structures, the structures are able to "de-tune" themselves from adverse resonant conditions, allowing less stiff and potentially lighter structures.

In absence of an effective and practical means to change the stiffness of elastic members in dynamic systems, vibration is often controlled by isolating vibrating components. In a broad context, isolation simply means allowing the vibrating components to move independently, as much as possible, in such a way as to minimize transmitted forces to the remaining system. This type of vibration control is commonly done by supporting or connecting the vibrating components with flexible elements. As applied to a helicopter, a common method of achieving this is by supporting the fuselage from the vibrating rotor and pylon using elastomeric supports acting as springs.

Figure 2A:
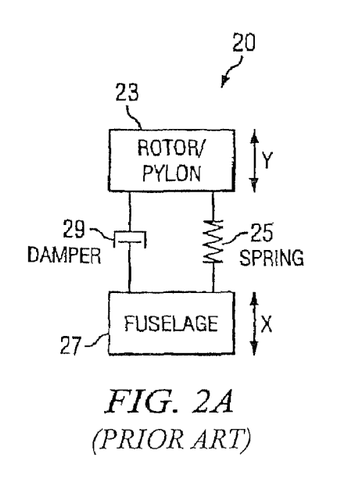
FIG. 2A is a schematic of a simple dynamic system for a helicopter.
Figure 2B:
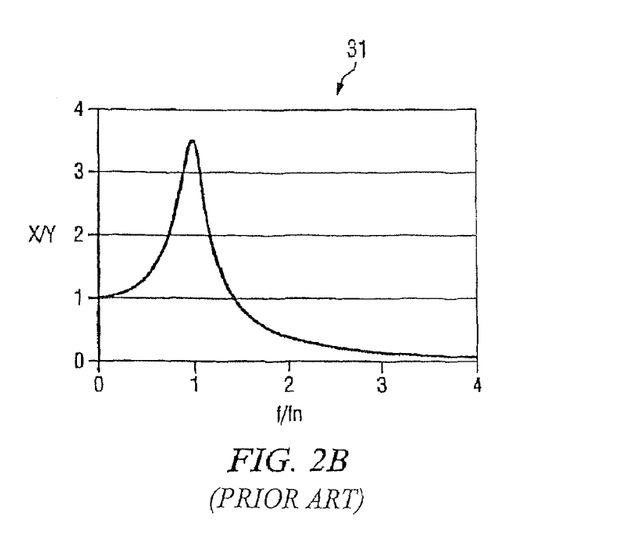
FIG. 2B is a plot of the frequency response of the dynamic system of FIG. 2A.

A model of a simple helicopter dynamic system 20 is illustrated in FIGS. 2A and 2B in the drawings. As is shown, a rotor/pylon 23 is supported by a spring 25 and a damper 29 attached to a fuselage 27. The frequency response of system 20 is shown in a plot 31 of FIG. 2B. As shown in the far right of plot 31, the relative motion X of fuselage 27 with respect to the motion Y of rotor/pylon 23 becomes small when the natural frequency fn is much smaller than the frequency of motion f of rotor/pylon 23. In this system, the softer the spring 25, the lower the natural frequency fn, and corresponding motion X of fuselage 27. With regard to vibration isolation, any support in such an application should be as soft as possible. However, if spring 25 is too soft, excessive deflections can occur as rotor loads change.

U.S. Pat. No. 4,362,281 issued to Cresap et al. is based upon this principle, and embodies a soft spring support for isolation of the vibrating rotor/pylon during steady flight conditions. To prevent excessive deflections during changing flight conditions and variations in rotor thrust, mechanical stops are incorporated that "bottom out" and limit motion during these transient conditions. Thus, in the Cresap et al. system, the system stiffness changes from relatively soft to effectively very stiff at the limits of pylon motion.

Figure 3:
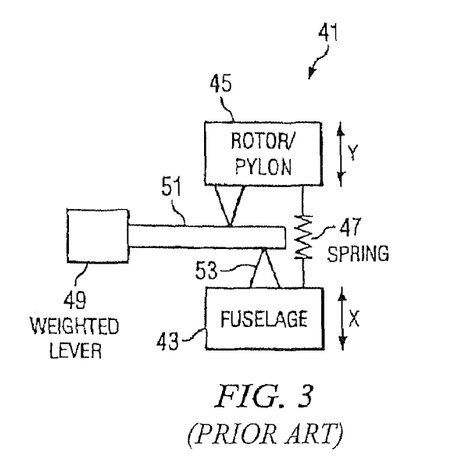
FIG. 3 is a schematic of a Kaman dynamic antiresonant vibration isolator.

In some dynamic helicopter systems, dynamic components themselves are used as supports between the helicopter rotor/pylon and the fuselage. The dynamic antiresonant vibration isolator (DAVI) is an example of such an approach. A simple model of DAVI system 41 is illustrated in FIG. 3. In DAVI system 41, a fuselage mass 43 is attached to a rotor/pylon 45 using a spring element 47 in parallel with a weight 49 on a lever 51. The mechanical advantage of weight 49 and lever 51 can be tailored so that when rotor/pylon 45 is oscillating at a particular frequency, the inertial and spring forces acting on fuselage 43 through a lever pivot 53 and spring element 47 are equal and opposite, so that, theoretically, no net forces are acting on the fuselage.

The devices disclosed in U.S. Pat. No. 6,247,684 issued to Manfredotti and U.S. Pat. No. 4,365,771 issued to Halwes are based upon the DAVI principle. Manfredotti discloses a dynamic component intended for use as a support between a helicopter rotor/pylon and fuselage, and Halwes discloses a liquid inertia vibration isolator. In these devices, the net forces acting on the structure are minimized, thereby limiting vibration. These devices, however, are only effective within a narrow frequency band of operation, and may not provide adequate isolation as rotor rpm, flight, or operating conditions change.

The rotary beam variable stiffness wing spar described in U.S. Pat. No. 6,000,660 issued to Griffin et al. discloses a variable stiffness element for use in dynamically tailored airframe structures. In the Griffin et al. device, the wing spar is a non-rectangular beam, having different bending stiffness depending upon the orientation of the beam and loading. When rotated within the wing, the stiffness and dynamic properties of the wing can be varied. The Griffin et al. device is very large and heavy, and difficult or impractical to implement in but a few locations.

Although the foregoing designs represent considerable advancements in the area of vibration isolation and control, many shortcomings remain.

SUMMARY OF THE INVENTION

There is a need for a compact and light weight vibration control device that can effectively change the stiffness at various structural attachments within a dynamic system, so that various natural frequencies within the system can be tuned to prevent adverse resonant conditions in real time.

Therefore, it is an object of the present invention to provide a compact and light weight vibration control device that can provide a different stiffness at various structural attachments within a dynamic system, thereby providing a simple means for changing the system natural frequencies and responses to applied forces.

This object is achieved by providing a variable stiffness support having a support housing that is configured to adjust the orientation of an internal elastomer assembly. In the preferred embodiment, the support housing includes a worm gear assembly, and the elastomer assembly includes an outer ring that encircles an elastomeric material, a central bushing embedded in the elastomeric material, and a plurality of shims embedded in the elastomeric material in a parallel planar fashion.

The present invention provides many significant benefits and advantages, including: (1) the ability to tailor the stiffness characteristics of dynamic systems or structures; (2) depending upon the orientation of the device, significant changes in stiffness may be accomplished, thereby providing a wide range of adjustment for various loading conditions; (3) less wear of parts resulting from reduced vibration; (4) it provides a lightweight and simple method for changing the stiffness of a structure at critical points within the structure; (5) the stiffness is continuously variable over the entire range of adjustment, not just at the limits of the components; and (6) the system does not merely balance inertial and spring forces.

DESCRIPTION OF THE PREFERRED EMBODIMENT

Figure 4:
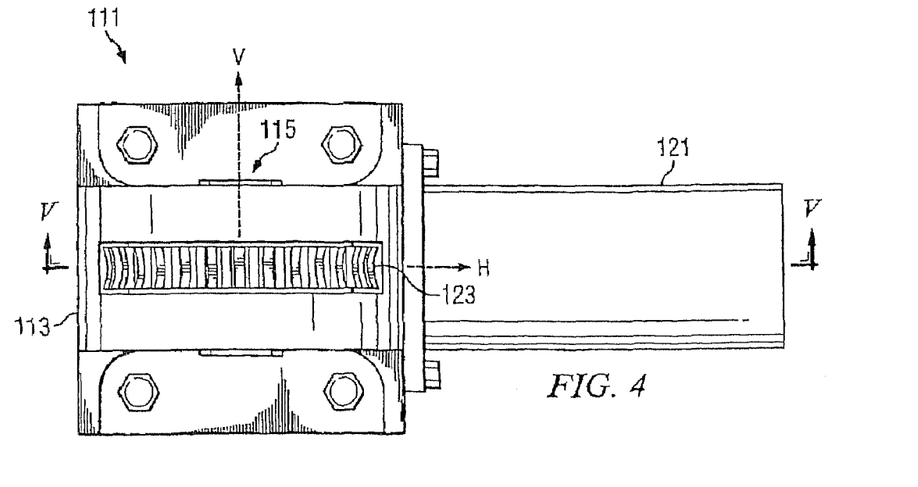
FIG. 4 is a top view of a variable stiffness support according to the present invention.
Figure 5:
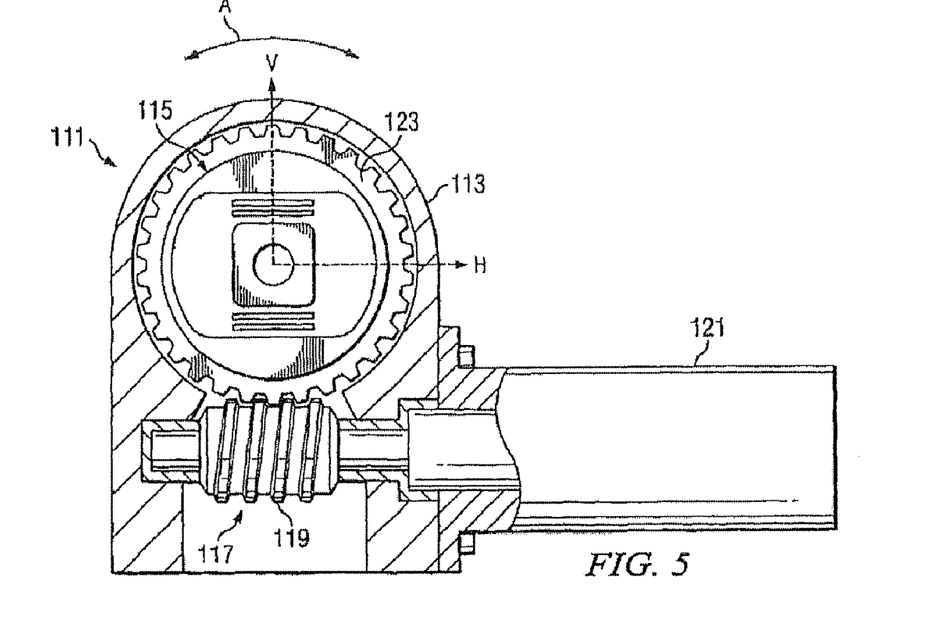
FIG. 5 is a partial cross-sectional view of the variable stiffness support of FIG. 4 taken a V-V.

Referring now to FIGS. 4 and 5 in the drawings, a variable stiffness support 111 according to the present invention is illustrated. Variable stiffness support 111 provides for avoiding resonance by controlling the natural frequency of a system by adjusting the stiffness of the system. Variable stiffness support 111 functions as a variable stiffness spring. Variable stiffness support 111 is configured in such a way as to provide a different stiffness dependent upon the orientation of the elastomer assembly with respect to the direction of an applied load or deflection. When applied to dynamic systems, the present invention provides a simple means for changing the system natural frequencies and responses to applied harmonic forces. This allows selective "tuning" of a system away from resonant conditions, where vibrations and forces are high and potentially destructive. As such, variable stiffness support 111 is particularly well suited to provide variable stiffness at structural joints or attachments.

Variable stiffness support 111 includes a support housing 113 that is configured to adjust the angular orientation of an internal elastomer assembly 115. In the preferred embodiment, support housing 113 houses an adjustment mechanism 117 for adjusting the angular orientation of elastomer assembly 115 about a central axis 114 (see FIG. 7) in the direction of arrow A. In the preferred embodiment, adjustment mechanism 117 is a worm gear assembly having a worm 119 driven by a gear motor 121, and an external gear 123 coupled to elastomer assembly 115 that is configured to mate with and be driven by worm 119. Gear motor 121 is configured to controlled and actuated remotely, for example, by a pilot in the cockpit of an aircraft.

Figure 6:
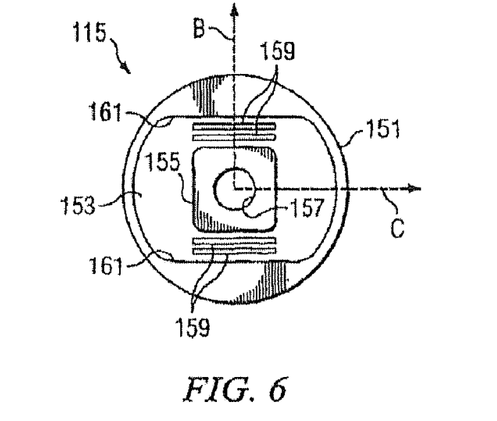
FIG. 6 is a front view of the elastomer assembly of the variable stiffness support of FIG. 4.
Figure 7:
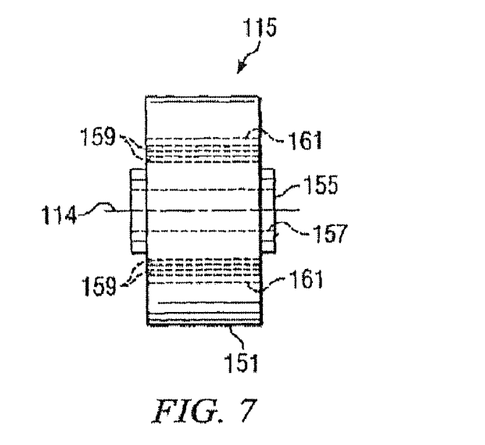
FIG. 7 is a top view of the elastomer assembly of FIG. 6.
Figure 8A:
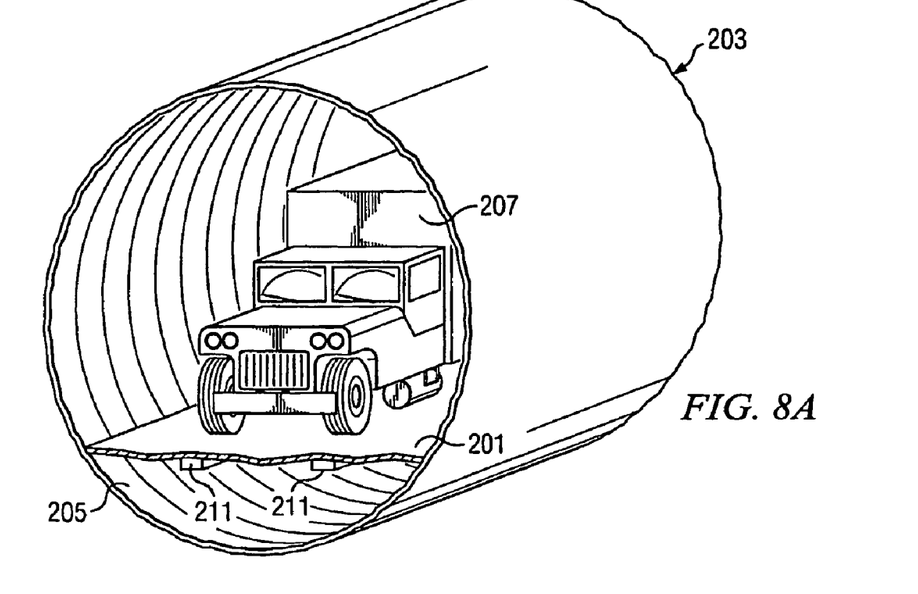
FIG. 8 is a schematic of an adaptive stiffness floor mount application utilizing a plurality of the variable stiffness supports of FIG. 4.
Figure 8B:
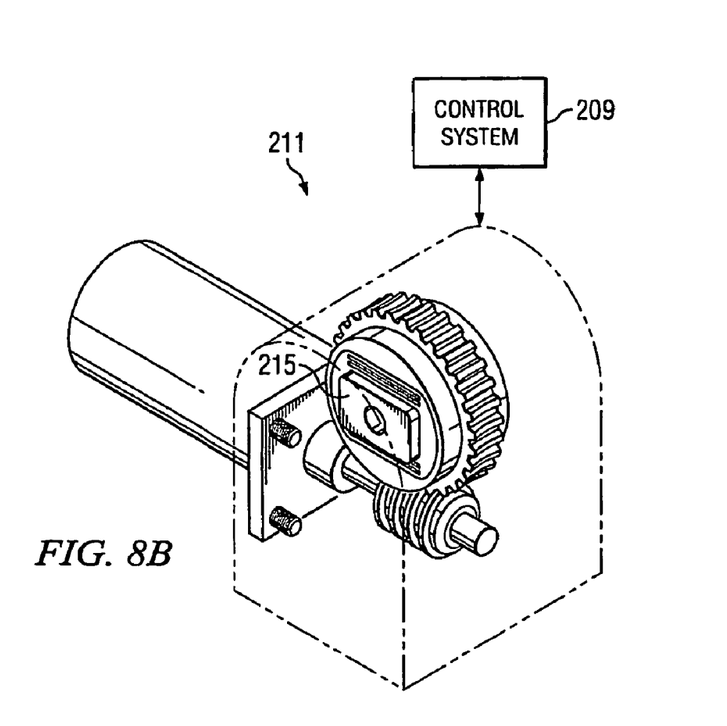

Referring now to FIGS. 6 and 7 in the drawings, elastomer assembly 115 is illustrated. Elastomer assembly 115 includes an outer ring-shaped housing 151 that surrounds an elastomeric material 153. A central bushing 155 having a central aperture 157 is embedded in elastomeric material 153. Bushing 155 preferably has a generally square or rectangular cross-sectional area with the corners rounded off. Bushing 155 may also be elongated with rounded ends as shown in FIG. 8. A plurality of thin rigid shims 159 are embedded in elastomeric material 153 in a parallel planar fashion on both sides of bushing 155. Shims 159 are preferably aligned parallel with opposing sides of bushing 155. In the preferred embodiment, the interior surface of outer ring-shaped housing 151 is annular in shape, except for two opposing internal chord surfaces 161 that are aligned parallel with bushing 155 and shims 159. This parallel stacking configuration of bushing 155, shims 159, and chord surfaces 161 provides for a relatively high stiffness in the direction indicated by arrow B, and a relatively low stiffness in the direction of arrow C.

In operation, forward and reverse actuation of gear motor 121 rotates elastomer assembly 115, thereby changing the orientation of elastomer assembly 115. Changes in the orientation of elastomer assembly 115 changes the stiffness of variable stiffness support in the directions of arrows B and C. Variable stiffness support 111 provides the ability to tailor the stiffness characteristics of dynamic systems or structures.

Referring now to FIG. 8 in the drawings, one application for which variable stiffness support 111 is particularly well suited is illustrated. In this application, a plurality of variable stiffness supports 211 are installed underneath a loaded cargo floor 201 of a cargo bay 203 of an aircraft, forming an adaptive stiffness floor. Variable stiffness supports 211 form an interconnected distributed array that is driven and controlled by a control system 209. Control system 209 and variable stiffness supports 211 provide the ability to selectively change the stiffness between loaded cargo floor 201 and an adjacent fuselage structure 205. A cargo mass 207 is associated with the local variable stiffness to preclude resonance problems. Thus, variable stiffness supports 211 provide the ability to de-tune the airframe from harmful resonant conditions.

Depending upon the orientation of elastomer assemblies 215, significant changes in stiffness may be accomplished, thereby providing a wide range of adjustment for various loading conditions. Because no mechanical stops are used, the stiffnesses of variable stiffness supports 211 are continuously variable over the entire range of adjustment, not just at the limits of certain components.

Control system 209 includes neural networks or random optimization methods, such as genetic algorithms. In the preferred embodiment, an algorithm known as "simulated annealing" is used. Simulated annealing is a random optimization method, similar to genetic algorithms; however, unlike genetic algorithms, simulated annealing uses a single solution that "walks" through the design space and "learns" the topology of the objective function. In this manner variable stiffness supports 211 allow for reduced vibration and weight, increased payload and range, and less wear of parts resulting from reduced vibration. It should be understood that this concept of an adaptive stiffness floor may be utilized in a wide range of cargo transport applications, not just cargo aircraft.

Figure 9:
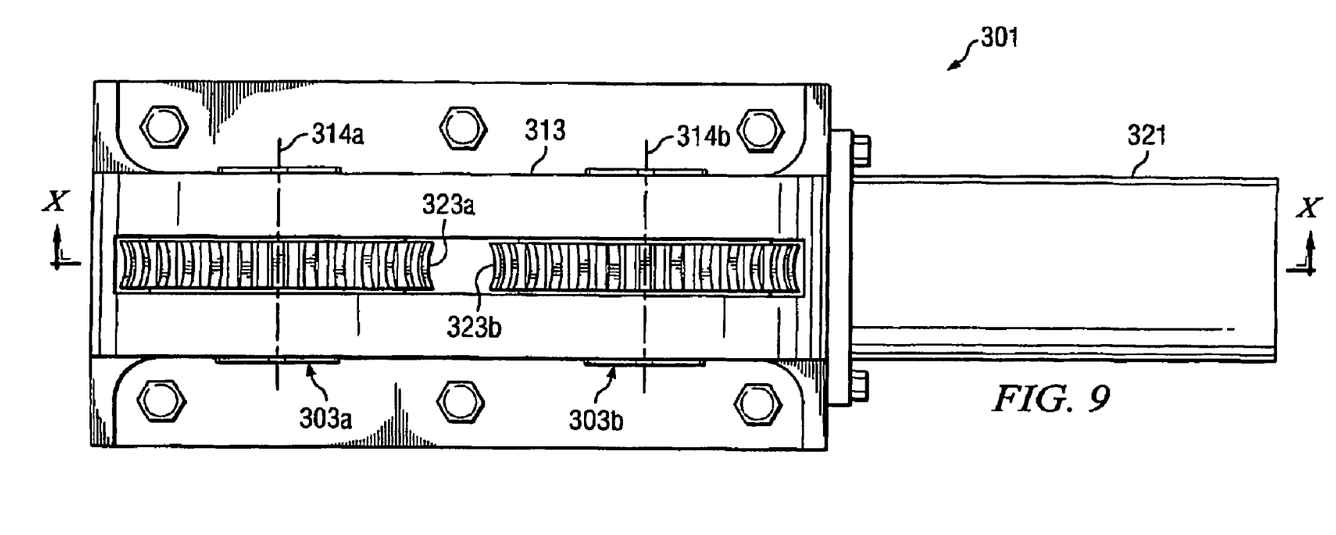
FIG. 9 is a top view of an alternate embodiment of the variable stiffness support according to the present invention.
Figure 10:
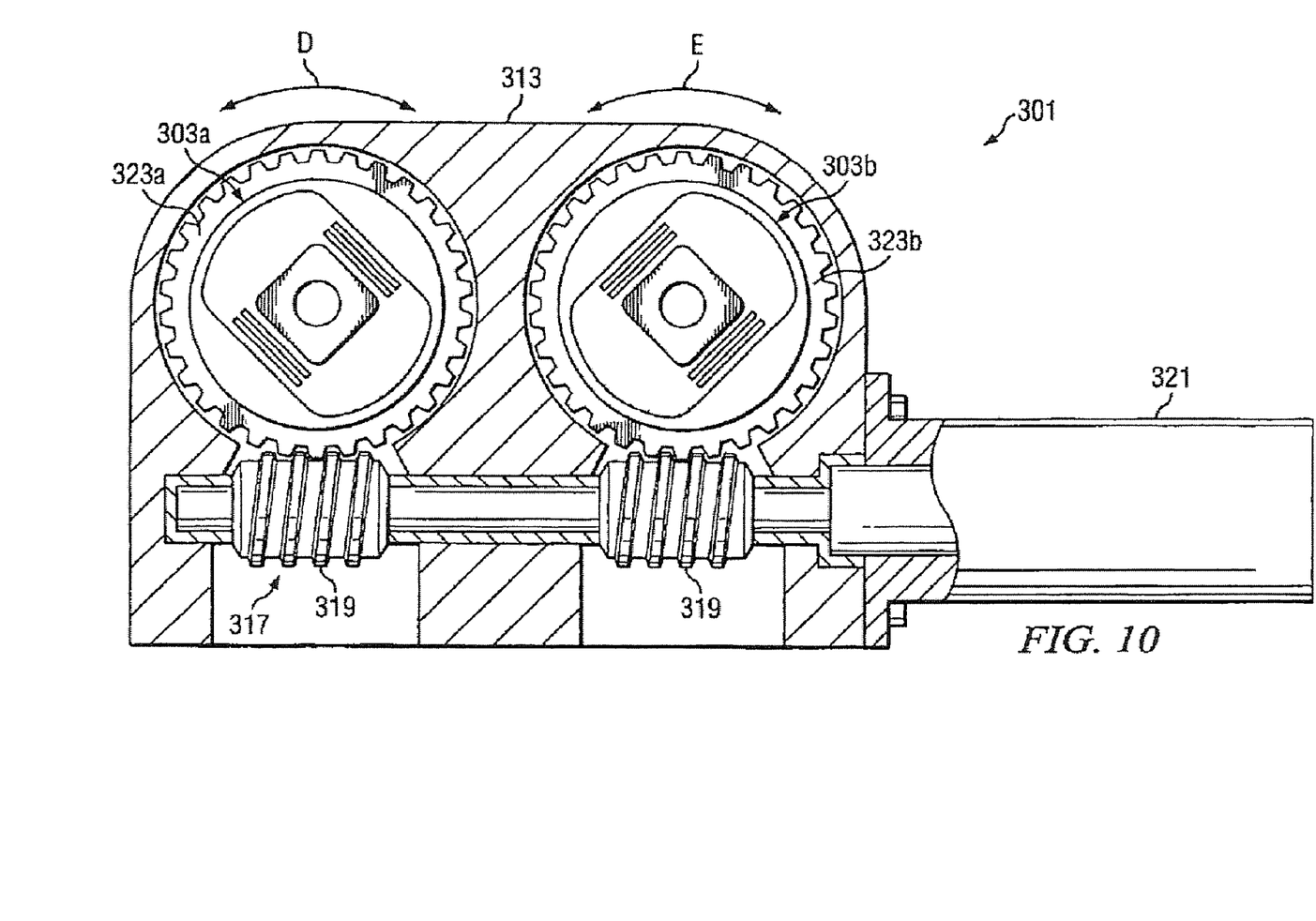
FIG. 10 is a partial cross-sectional view of the variable stiffness support of FIG. 9 taken a X-X.

Referring now to FIGS. 9 and 10 in the drawings, an alternate embodiment of the variable stiffness support according to the present invention is illustrated. In this embodiment, a variable stiffness support 301 includes two collocated, counter-rotating elastomer assemblies 303a and 303b. Elastomeric assemblies 303a and 303b are preferably identical in form and function as elastomeric assembly 115. Variable stiffness support 301 includes a support housing 313 that is configured to adjust the angular orientation of elastomer assemblies 303a and 303b. In this embodiment, it is preferred that support housing 313 houses an adjustment mechanism 317 for adjusting the angular orientation of elastomer assemblies 303a and 303b about respective central axes 314a and 314b in the directions of arrows D and E.

In this embodiment, it is preferred that adjustment mechanism 317 be a worm gear assembly having a worm 319 driven by a gear motor 321, and external gears 323a and 323b coupled to elastomer assemblies 303a and 303b, respectively. External gears 323a and 323b are configured to mate with and be simultaneously driven by worm 319. Gear motor 121 is configured to controlled and actuated remotely, for example, by a pilot in the cockpit of an aircraft. It is also preferred that adjustment mechanism 317 be configured such that elastomeric assemblies 303a and 303b counter-rotate, i.e., rotate in opposite directions.

One advantage to this configuration is that when both elastomer assemblies 303a and 303b are attached to a common point on a supported structure (not shown), lateral loads from each elastomer assembly 303a and 303b are cancelled out locally, and no net later force is introduced into the structure. This occurs when elastomer assemblies 303a and 303b are not oriented purely vertical. Variable stiffness support 301 provides for higher capacity as well.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A variable stiffness support comprising:
   a housing;
   a first elastomer assembly rotatably carried by the housing, the first elastomer assembly having different stiffnesses in at least two directions; and
   an adjustment mechanism for adjusting the orientation of the first elastomer assembly relative to the housing;
   wherein the first elastomer assembly comprises:
      an outer ring-shaped housing;
      an elastomeric material disposed within the outer ring-shaped housing;
      a bushing disposed at the center of the elastomeric material; and
      a plurality of shims disposed within the elastomeric material, the shims being aligned parallel with opposing sides of the bushing.

2. The variable stiffness support according to claim 1, wherein the outer ring-shaped housing has an annular outer peripheral surface and an inner surface having chord surfaces that are aligned with the opposing sides of the bushing and the shims.

3. The variable stiffness support according to claim 1, wherein the adjustment mechanism is a gear assembly comprising:
   a gear motor;
   a worm gear coupled to the gear motor; and
   an external gear matingly coupled to the worm gear, the external gear being coupled to the first elastomer assembly;
   wherein actuation of the gear motor causes rotation of the first elastomer assembly.

4. The variable stiffness support according to claim 1, further comprising:
   a second elastomer assembly rotatably carried by the housing.

5. The variable stiffness support according to claim 4, wherein the second elastomer assembly is collocated with the first elastomeric assembly.

6. The variable stiffness support according to claim 4, wherein the first elastomer assembly and the second elastomer assembly rotate in counter-rotational directions with respect to each other.

7. The variable stiffness support according to claim 4, wherein the second elastomer assembly has different stiffnesses in at least two directions.

8. The variable stiffness support according to claim 4, wherein the second elastomer assembly comprises:
   an outer ring-shaped housing;
   an elastomeric material disposed within the outer ring-shaped housing;

a bushing disposed at the center of the elastomeric material; and a plurality of shims disposed within the elastomeric material, the shims being aligned parallel with opposing sides of the bushing.

9. The variable stiffness support according to claim 4, wherein the external gear is matingly coupled to the second elastomer assembly and actuation of the gear motor causes rotation of the second elastomer assembly.

10. The variable stiffness support according to claim 9, wherein the adjustment mechanism is manually operated by a pilot.

11. The variable stiffness support according to claim 9, wherein the adjustment mechanism is automatically operated by a control system.

\* \* \* \* \*

UNITED STATES PATENT AND TRADEMARK OFFICE
CERTIFICATE OF CORRECTION

PATENT NO. : 7,650,819 B2 Page 1 of 1
APPLICATION NO. : 10/515391
DATED : January 26, 2010
INVENTOR(S) : Haynes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this

Twenty-third Day of November, 2010

David J. Kappos
*Director of the United States Patent and Trademark Office*